US012790886B2

(12) United States Patent
Miller

(10) Patent No.: US 12,790,886 B2
(45) Date of Patent: Nov. 10, 2026

(54) MODULAR SECURITY DOOR

(71) Applicant: Qualitas Manufacturing Incorporated, Itasca, IL (US)

(72) Inventor: James V. Miller, Lake Villa, IL (US)

(73) Assignee: Qualitas Manufacuturing Incorporated, Itasca, IL (US)

( * ) Notice: Subject to any disclaimer, the term of this patent is extended or adjusted under 35 U.S.C. 154(b) by 217 days.

(21) Appl. No.: 18/421,917

(22) Filed: Jan. 24, 2024

(65) Prior Publication Data

US 2024/0247538 A1 Jul. 25, 2024

Related U.S. Application Data

(60) Provisional application No. 63/481,424, filed on Jan. 25, 2023.

(51) Int. Cl.
*E06B 5/11* (2006.01)

(52) U.S. Cl.
CPC .................................... *E06B 5/11* (2013.01)

(58) Field of Classification Search
CPC ... E06B 5/11; E06B 5/113; E06B 5/10; E06B 5/116; E06B 5/12; E06B 5/16; E06B 5/161; E06B 5/167; E06B 2003/7011; E06B 2003/7013
See application file for complete search history.

(56) References Cited

U.S. PATENT DOCUMENTS

| | | | | |
|---|---|---|---|---|
| 91,342 A | | 6/1869 | Ireland | |
| 3,894,357 A | * | 7/1975 | Stanfield | E06B 3/825 49/503 |
| 3,990,185 A | * | 11/1976 | Nagase | E06B 3/726 49/501 |
| 5,154,461 A | * | 10/1992 | Prescott | E05B 17/2084 292/DIG. 17 |

(Continued)

FOREIGN PATENT DOCUMENTS

| | | |
|---|---|---|
| EP | 1669536 A1 | 6/2006 |
| FR | 3023572 A1 | 1/2015 |

(Continued)

OTHER PUBLICATIONS

Profilmar catalog (2018).

(Continued)

*Primary Examiner* — Kyle J. Walraed-Sullivan
(74) *Attorney, Agent, or Firm* — Ice Miller LLP

(57) ABSTRACT

A modular security door system comprises a hollow core door and reinforcing member. The hollow core door has an inner space, and an opening into the inner space. A housing is positioned in the inner space, for receiving the reinforcing member. The opening is aligned with the housing for insertion of the reinforcing member into the housing. In another embodiment, the reinforcing member is plate-shaped. A bracket having a channel is positioned on an outer side of a door face, the channel sized and shaped to receive an edge of the plate-shaped reinforcing member. In another embodi- (Continued)

ment, the plate-shaped reinforcing member has a laminated structure with at least two layers made of different materials. The layers may be laminated together to form the reinforcing member before installation on the door, or may be assembled on the door.

9 Claims, 8 Drawing Sheets

(56) References Cited

U.S. PATENT DOCUMENTS

| | | | | |
|---|---|---|---|---|
| 5,340,172 | A * | 8/1994 | Sweet | E05C 19/003 292/259 R |
| 5,595,408 | A * | 1/1997 | Jeche | E05C 9/06 292/37 |
| 5,718,466 | A | 2/1998 | Weinerman et al. | |
| 6,047,999 | A | 4/2000 | Dixon, Jr. | |
| 6,062,293 | A * | 5/2000 | Berger, Jr. | E06B 3/485 52/801.12 |
| 6,330,768 | B1 * | 12/2001 | Rodrigues | E06B 5/12 248/354.3 |
| 6,497,077 | B1 * | 12/2002 | Emek | E06B 5/12 52/173.1 |
| 6,837,082 | B1 * | 1/2005 | Moore | E06B 5/11 70/108 |
| 7,661,733 | B1 * | 2/2010 | Angel | E05C 19/003 292/259 R |
| 8,550,506 | B2 | 10/2013 | Nakanishi et al. | |
| 11,248,411 | B2 * | 2/2022 | Vaccari | E06B 3/26345 |
| 11,414,915 | B1 * | 8/2022 | Cummings | G09B 19/00 |
| 2003/0089052 | A1 * | 5/2003 | Emek | E06B 5/12 52/202 |
| 2004/0177561 | A1 * | 9/2004 | Youssef | B64C 1/1469 49/394 |
| 2004/0189012 | A1 | 9/2004 | Katou et al. | |
| 2005/0257901 | A1 * | 11/2005 | Berger | E06B 3/485 160/229.1 |
| 2009/0183455 | A1 * | 7/2009 | Polk, Jr. | E04C 2/20 428/116 |
| 2010/0013244 | A1 | 1/2010 | Shimizu et al. | |
| 2010/0065231 | A1 * | 3/2010 | Kraeutler | E06B 9/56 160/331 |
| 2011/0227743 | A1 * | 9/2011 | Kilbourne | G08C 17/00 49/506 |
| 2014/0165886 | A1 * | 6/2014 | Yeremian | E06B 3/88 49/506 |
| 2016/0265267 | A1 * | 9/2016 | Sadeli | E06B 3/7001 |
| 2017/0145736 | A1 * | 5/2017 | Bourassa | E06B 3/74 |
| 2018/0051508 | A1 * | 2/2018 | Glover | B29C 44/1228 |
| 2018/0119480 | A1 * | 5/2018 | Fields, I | E05D 11/0018 |
| 2021/0277708 | A1 * | 9/2021 | Chen | E05B 65/1046 |
| 2021/0324667 | A1 * | 10/2021 | Grillo | E05C 19/003 |
| 2022/0081965 | A1 * | 3/2022 | Yamazaki | E06B 5/16 |
| 2022/0112748 | A1 | 4/2022 | Guillemette | |
| 2024/0141718 | A1 * | 5/2024 | Currie | E06B 5/10 |
| 2024/0401398 | A1 * | 12/2024 | Miller | E06B 9/15 |

FOREIGN PATENT DOCUMENTS

| | | | |
|---|---|---|---|
| GB | 2404215 | B | 4/2007 |
| JP | 380890 | | 8/1991 |
| JP | 5305064 | B2 | 9/2009 |
| WO | 2004104354 | A1 | 12/2004 |

OTHER PUBLICATIONS

U.S. Appl. No. 17/472,142, filed Sep. 10, 2021 (unpublished).

International Patent Application No. PCT/US24/12840 International Search Report, Written Opinion of the International Searching Authority (Jun. 17, 2024).

International Patent Application No. PCT/US24/12480, International Preliminary Report on Patentability (Aug. 7, 2025).

* cited by examiner

MODULAR SECURITY DOOR

CROSS-REFERENCE TO RELATED APPLICATIONS

This application claims the benefit of U.S. Provisional Application No. 63/481,424, filed Jan. 25, 2023, which is hereby incorporated by reference herein in its entirety.

BACKGROUND OF THE INVENTION

The present invention relates to security doors and, in particular, to modular security door systems.

Residential and non-residential burglaries cost billions of dollars in property losses each year. The majority of burglary offenses involve forcible entry or attempted forcible entry. Standard metal security doors are used throughout the country as an inexpensive way to provide protection for building access and emergency exit doors. These standard doors are typically hollow, and comprise an inner and outer skin of thin gauge metal which are bent, welded, and seamed together using a variety of techniques. The interior space within the hollow door is commonly filled with cardboard, foam, or other standard fillers. These fillers often provide some insulation (e.g., for cold weather) and improved fire ratings, but contribute minimal structural support to the door.

Standard hollow metal doors are vulnerable to modern power cutting tools, which can easily compromise the security of a building. Portable battery-operated grinders, reciprocating saws, and circular saws are inexpensive and readily available, and are capable of cutting through any material, including metal and concrete. These tools can quickly cut through conventional security doors to allow easy access to the building. Although security doors may include sensors to detect vibration or compromise, such sensors are expensive, can be temperamental, and are not commonly used.

Security doors are often located at the rear of a building, in an alley, or other inconspicuous location that provides concealment and increases their vulnerability to forced entry. For example, retail businesses such as liquor stores and electronics stores commonly keep their inventories in a storeroom located at the back of a building or adjacent to an alley to facilitate delivery and storage of large quantities of product. Standard metal security doors are often insufficient to prevent forced entry to these storerooms, which become easy targets for theft of valuable inventory that is readily accessible and moveable.

Security doors can be manufactured with integrated features that improve resistance to power tools and other methods of forced entry, such as reinforcing steel bars and plates. These features are either positioned within the interior space of the hollow door for immediate engagement of the tool, or are applied to the surface of the door. However, these integrated security features increase the difficulty of manufacture, add time and expense to the manufacturing process, and make it costly to maintain an inventory of security door products. Security features also add weight to the door, which can increase the costs and susceptibility to damage in shipping, and can also increase the difficulty of installing the security door. As a result, manufacturers and dealers may be slow to respond to customer needs, which are often unplanned (e.g., commercial break-ins) and require an immediate response to protect property and valuable product inventory.

It would be desirable to provide a modular security door system where the security features can be fitted to the door after manufacture, such as by a third party in preparation for installation of the security door, or during installation itself. The modular system would also permit the user to customize the security features of the door within the manufacture/supply chain or at installation, and to upgrade the security features in the future. A modular system also provides a cost-effective option of maintaining an inventory of "blank" doors without security features, that are ready to install and would allow manufacturers and dealers to rapidly respond to customer needs. For example, a dealer can quickly install the blank doors from its available stock to protect customer property after a break-in, without the delay of manufacturing and shipping a conventional door system with integrated security features. The installed blank door can later be retrofit and upgraded with customized security features.

SUMMARY OF THE INVENTION

An embodiment of a security door system comprises a reinforcing member, a hollow door, and a housing. The hollow door has opposite first and second faces, opposite first and second vertical edges, opposite top and bottom ends, an inner space between the first and second faces, and an opening in at least one of the first and second vertical edges. The opening is sized and shaped to receive the reinforcing member. The housing is positioned in the inner space, and is sized and shaped to receive the reinforcing member. The housing is also aligned with the opening to removably receive the reinforcing member through the opening.

Another embodiment of a security door system comprises a reinforcing member, a door, and a bracket. The door has opposite first and second door faces, opposite first and second door vertical edges, and opposite top and bottom door ends. The bracket is positioned on the first face, and comprises a spacer and first arm. The spacer has first and second spacer ends, the first spacer end coupled to the first door face. The first arm extends from the spacer second end, parallel to the first door face. The first door face, spacer, and first arm form a first bracket channel that is sized and shaped to receive the reinforcing member.

Another embodiment of a security door system comprises a door, a plate-shaped reinforcing member, and first and second brackets. The door has opposite first and second door faces, opposite first and second door vertical edges, and opposite top and bottom door ends. The plate-shaped reinforcing member has opposite top and bottom plate ends, opposite first and second plate vertical edges, and a vertical height between the top and bottom plate ends. The first bracket is coupled to the first door face, and forms a first bracket channel that is sized and shaped to receive the top plate end. The second bracket is coupled to the first door face, and forms a second bracket channel that is sized and shaped to receive the bottom plate end.

Another embodiment of a security door system comprises a door and plate-shaped reinforcing member. The door has opposite first and second door faces, opposite first and second door vertical edges, and opposite top and bottom door ends. The plate-shaped reinforcing member is coupled to the first door face, and comprises laminated first and second layers made of different materials. The first layer is coupled to the first door face, and the second layer is coupled to the first layer.

DETAILED DESCRIPTION OF THE INVENTION

Referring to FIGS. 1-4, embodiments of a modular door system are shown, that comprises a hollow core door 10 and a reinforcing member. Door 10 has opposite front (exterior) and rear (interior) faces 12*a* and 12*b*, opposite vertical edges 14*a* and 14*b*, and opposite top and bottom ends 16*a* and 16*b*. An enclosed inner space 18 is defined between front and rear faces 12*a* and 12*b*. One or more openings 20 are formed in vertical edges 14*a* and/or 14*b*. In one embodiment, door 10 is a conventional hollow core, metal security door. Inner space 18 of door 10 may be filled with various materials known in the art, such as cardboard honeycomb, polymer foam (e.g., polystyrene or polyurethane foam), metal vertical stiffeners, and/or fiberboard panels.

Reinforcing members are positioned in inner space 18, and preferably extend across the horizontal width of door 10 between vertical edges 14*a* and 14*b*. In one embodiment, one or more housings are positioned in inner space 18, that extend horizontally across the width of door 10. The housings are configured to receive a reinforcing member, and are aligned with openings 20 for insertion of a reinforcing member through an opening and into a housing. The reinforcing member may be received in a single housing. Alternatively, multiple housings may be aligned horizontally across door 10 to support a reinforcing member. The modular door system may include one or more plugs or covers that are configured to cover and conceal openings 20, and prevent removal of the reinforcing members from the housing.

The reinforcing member may have different configurations and may be made of different materials resistant to forced entry—e.g. anti-cut materials, drill resistant materials and/or impact resistant materials. In one embodiment, the reinforcing member is a reinforcing bar or rod made of hardened steel or other metals or metal alloys known in the art. Suitable non-metal materials include ceramics, carbon fiber materials, and polymer fiber materials (e.g., aramid fiber), which may be used alone, in combination with each other, or in combination with metals or metal alloys to provide resistance to multiple methods of forced entry.

Figure 1:
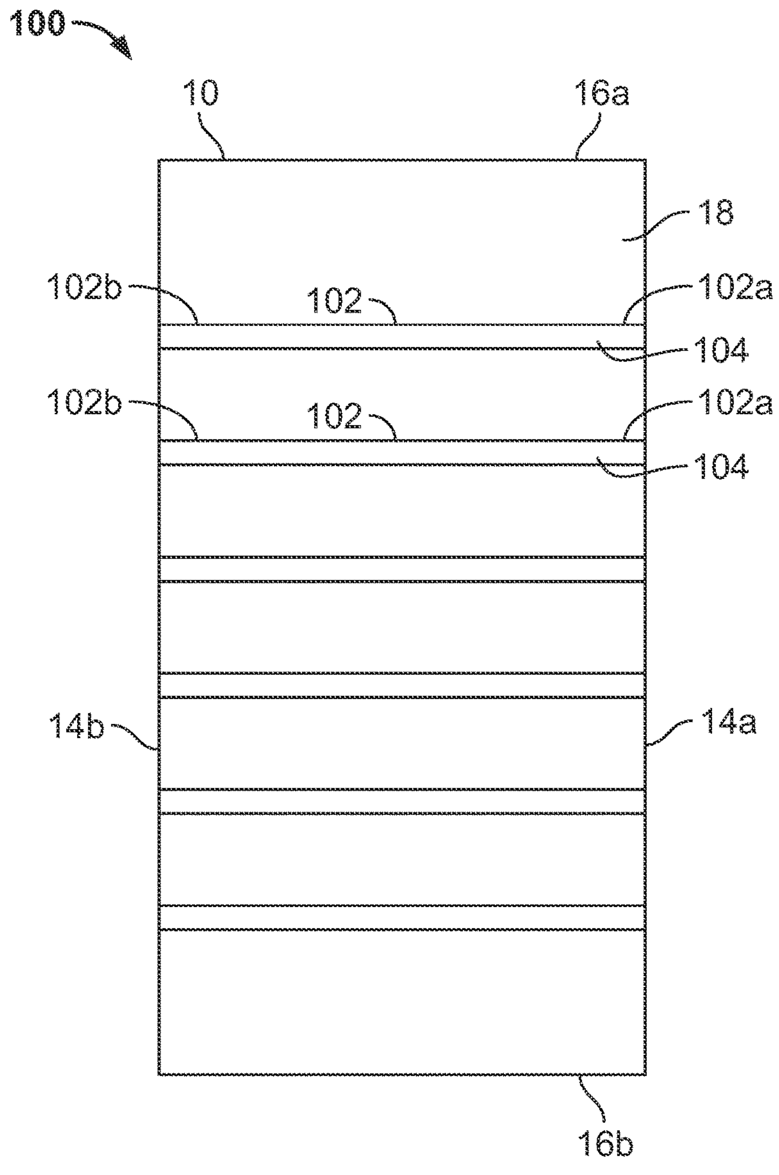
FIG. 1 is a front section view of an embodiment of a modular door.
Figure 2:
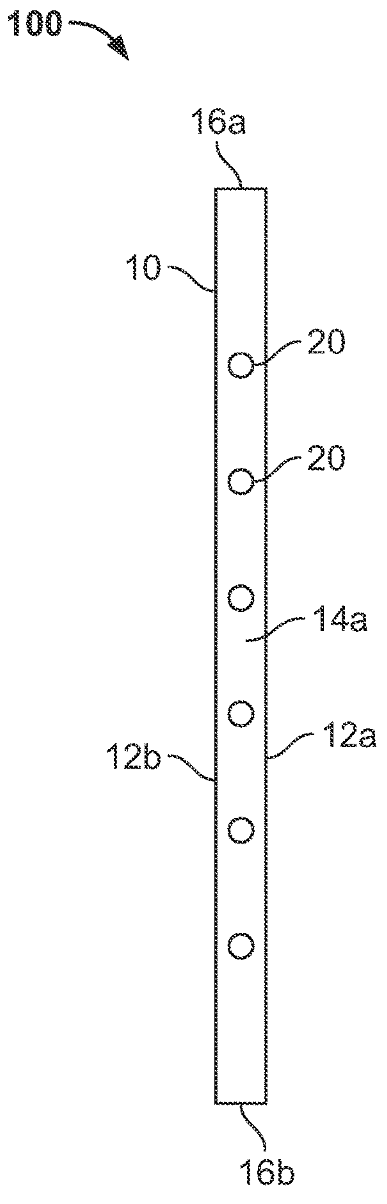
FIG. 2 is a side elevation view of the modular door of FIG. 1.

FIGS. 1 and 2 show an embodiment of a modular security door system 100 with a housing that comprises a hollow tube 102 with an inner channel 104 that is sized and shaped to removably receive a reinforcing member (not shown). Tube 102 is a preferably a cylindrical tube with a channel 104 having a circular cross-section, that is sized and shaped to receive the reinforcing member. However, those of skill in the art will appreciate that tube 102 and channel 104 may have other shapes, such as a polygonal or lobed cross-section. Tube 102 is preferably made of metal (e.g., steel) and may be secured to door faces 12*a* and/or 12 by welding, using fasteners (e.g., screws, bolts, rivets), or other methods known in the art.

In a preferred embodiment, tube 102 spans the entire horizontal width of door 10 between vertical edges 14*a* and 14*b*, and has opposite ends 102*a* and 102*b* that are respectively positioned at edges 14*a* and 14*b*. One or more openings 20 are formed in door edges 14*a* and/or 14*b*, that are aligned with tube ends 102*a* and/or 102*b* to provide access to channel 104. Openings 20 are sized and shaped to receive a reinforcing member, for sliding insertion of the reinforcing member through an opening and into channel 104. Modular door system 100 may include one or more covers (not shown) that are configured to cover openings 20 to prevent removal of reinforcing members 22 from tube 102. In one embodiment, the covers may be snap fit into openings 20, and may also be either decorative or designed to blend in with door 10.

Figure 3:
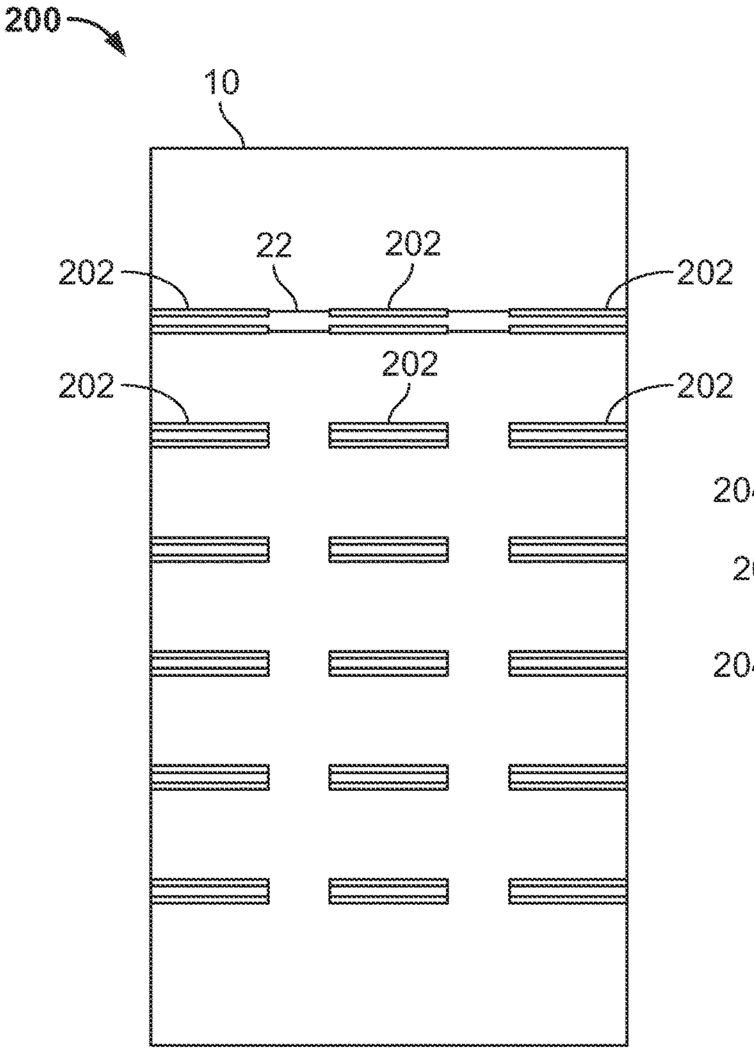
FIG. 3 is a front section view of another embodiment of a modular door.
Figure 4:
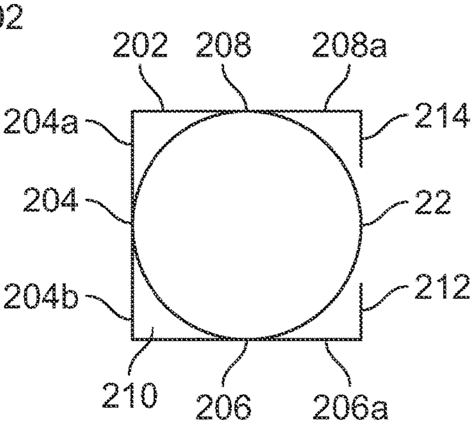
FIG. 4 is a side section view of an embodiment of a bracket for the modular door of FIG. 3.

FIGS. 3 and 4 show an alternative embodiment of a modular door system 200, with a housing that comprises a bracket 202 which is configured to receive and support a reinforcing member 22 in door inner space 18. Bracket 202 comprises a base 204 and arm 206. Base 204 may be coupled to door front or rear face 12*a* or 12*b*, to position and secure bracket 202 in door inner space 18. The relatively large surface area of base 204 increases the contact area with the door face and facilitates secure coupling of bracket 202. Arm 206 extends between door front and rear faces 12*a* and 12*b* to form a support for removably receiving reinforcing member 22 on the arm to position the reinforcing member in door inner space 18. Arm 206 is aligned with an opening 20 in door edge 14*a* and/or 14*b*, for sliding insertion of reinforcing member 22 onto the arm. Reinforcing member 22 may be supported by a single bracket 202 that spans the horizontal width of door 10, or by multiple brackets 202 with horizontally aligned arms 206 that combine to support member 22 (FIG. 3).

In a preferred embodiment, bracket 202 is C-shaped, with a base 204, and upper and lower arms 208 and 206 that define a bracket inner channel 210. Base 204 is coupled to door front or rear face 12*a* or 12*b*, and has opposite upper and lower base ends 204*a* and 204*b*. Upper and lower arms 208 and 206 respectively extend from base ends 204*a* and 204*b*, between door faces 12*b* and 12*a*. Inner channel 210 is formed between base 204 and arms 206 and 208, and is sized and shaped to removably receive reinforcing member 22. Inner channel 210 is aligned with an opening 20 in door edge 14*a* and/or 14*b*, for sliding insertion of reinforcing members 22 through the opening and into channel 210.

In one embodiment, bracket 202 is coupled to both front and rear door faces 12*a* and 12*b*. For example, where base 204 is coupled to rear door face 12*b*, arms 206 and 208 respectively have ends 206*a* and 208*a* that extend toward and are positioned adjacent to door face 12*a* for coupling to the door face. In a preferred embodiment, flanges 212 and 214 respectively project from arm ends 206*a* and 208*a*, and extend generally parallel to door face 12*a*. Flanges 212 and 214 increase the contact area between bracket 202 and door face 12*a* to facilitate secure coupling to the door face.

In one embodiment, bracket 202 has a generally rectangular cross-section, with arms 206 and 208 extending at right angles from base 204, and flanges 210 and 212 extending at right angles from arms 206 and 208. Inner channel 210 preferably has a square cross-section that is sized to receive a cylindrical rod-shaped reinforcing member 22, as shown in FIG. 4. The box-like (right angle) configuration of bracket 202, and the relatively large contact area of base 204 (and flanges 212 and 214) for coupling to door faces 12*a* and 12*b*, add structural support to hollow core door 10, such that conventional core supporting materials may not be required (e.g. metal stiffeners, fiberboard panels). Bracket 202 may be made of metal (e.g., bent sheet steel) or other materials known in the art, and may be secured to door faces 12*a* and/or 12 by welding, fasteners (e.g., screws, bolts, rivets), adhesives, or other methods known in the art.

Reinforcing members 22 will typically comprise relatively bulky and heavy elements (e.g., steel rods). Modular security doors systems 100 and 200 allow reinforcing members 22 to be inserted in the housings (e.g., tubes 102, brackets 202) after installation of door 10, which reduces the costs of manufacture and shipping, and facilitates installation of door 10 and the modular security door system. Reinforcing members 22 are easily installed by sliding insertion through openings 20 and into the receptacles of tubes 102 or brackets 202. In a preferred embodiment, the security doors are available as "blanks" without reinforcing members 22 and with multiple housings positioned in door inner space 18, to allow customization of the number and location of reinforcing members 22 in door 10. For example, a customized configuration of reinforcing members 22 may be mounted in door 10 by a dealer prior to, upon, or after installation of the door at a job site. Modular door systems 100 and 200 also permit additional reinforcing members 22 to be installed at a later time to supplement protection.

Figure 5:
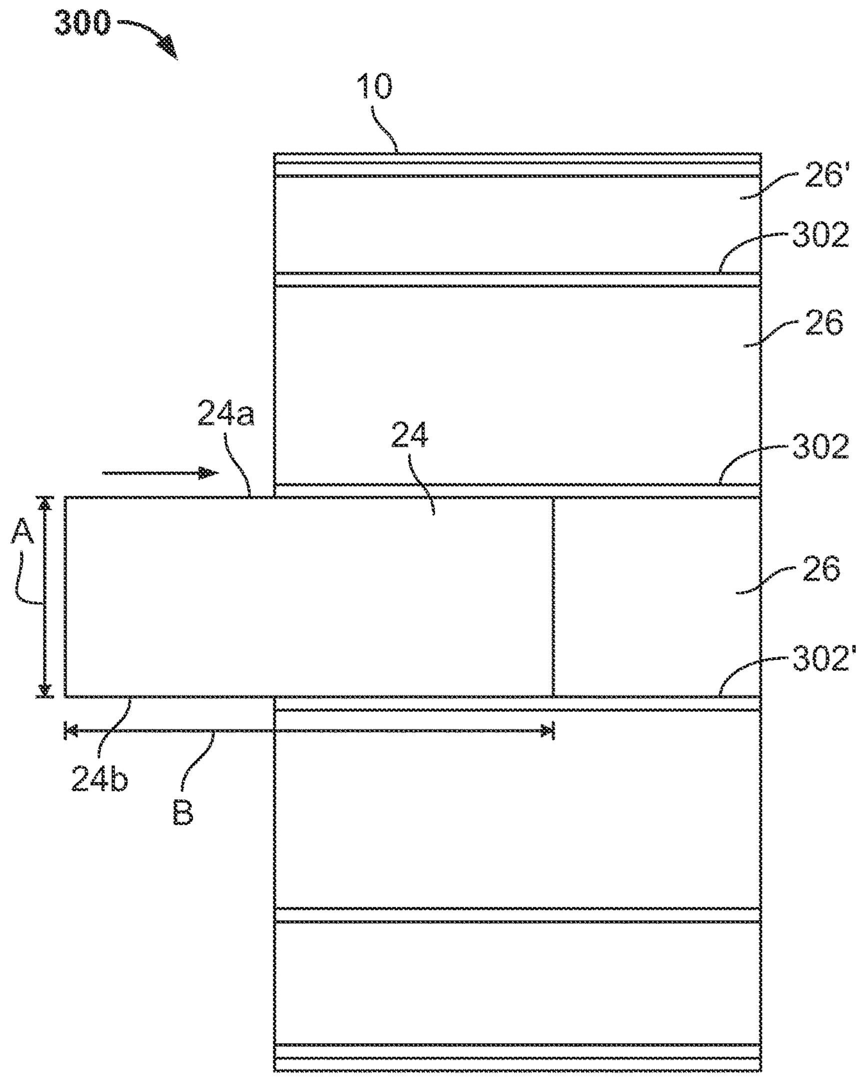
FIG. 5 is a rear elevation view of another embodiment of a modular security door, showing the installation of a reinforcing plate.
Figure 6:
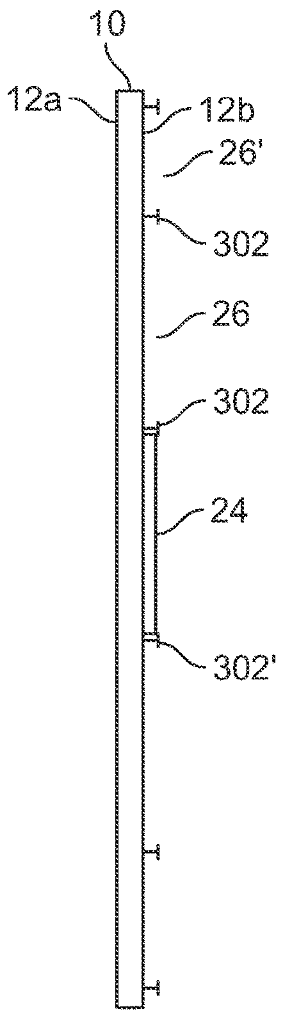
FIG. 6 is a side elevation view of the modular security door and reinforcing plate of FIG. 5.
Figure 7:
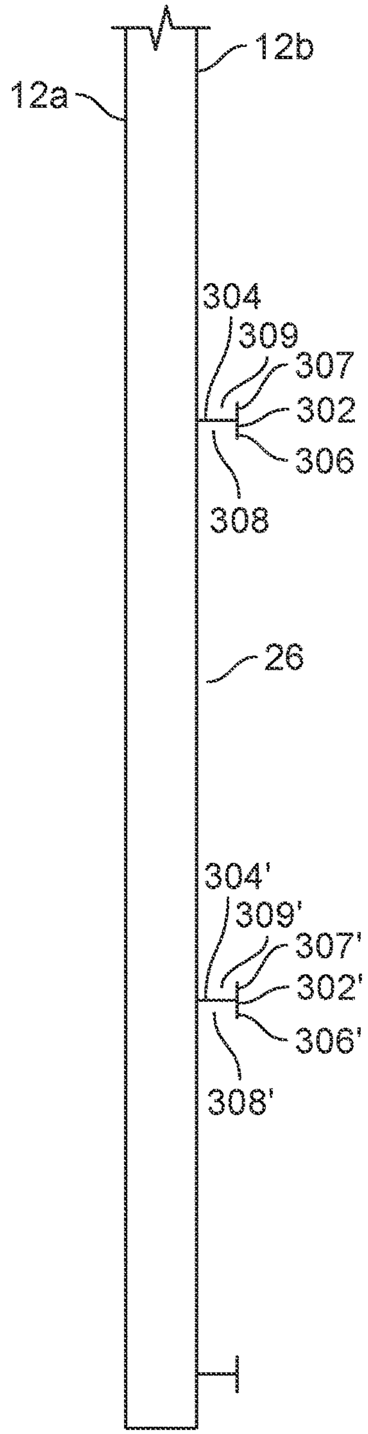
FIG. 7 is a detail view of the modular security door of FIG. 6.

FIGS. 5-7 show another embodiment of a modular door system 300, with a one or more housings that comprise a bracket 302 positioned on the outer surface (i.e. opposite inner space 18) of door face 12*a* and/or 12*b* for receiving a reinforcing member 24. In one embodiment, reinforcing member 24 is plate-shaped with opposite top and bottom ends 24*a* and 24*b*, a vertical height A between the top and bottom ends, a horizontal width B, and a thickness. Reinforcing plate width B is preferably about the width of door 10, to provide protection across the horizontal span of the door. Reinforcing plate 24 provides increased resistance to penetration (e.g., by drilling and/or cutting), and may be made of metal, ceramic, and/or other materials known in the art.

Reinforcing plate 24 is preferably installed on door rear face 12*b* that faces the interior of a building or other structure, so the reinforcing plate is not accessible from the outside. Brackets 302 extend horizontally across door 10 and include a channel for receiving and retaining reinforcing plate 24 on door 10. In one embodiment, bracket 302 has a generally L-shaped cross-section, and comprises a spacer 304 and arm 306 extending on one side of the spacer. Spacer 304 projects from door face 12*b* approximately perpendicular to the plane of the door face, and has opposite ends 304*a* and 304*b*. End 304*a* is coupled to door face 12*b*, and bracket arm 306 projects from end 304*b* and extends approximately parallel to the plane of the door face (perpendicular to spacer 304). Spacer 304, arm 306, and door face 12*b* define a longitudinal U-shaped channel 308 that extends horizontally across door 10 and is sized and shaped to receive reinforcing member 24. In one embodiment, the length between spacer ends 304*a* and 304*b* is approximately the thickness of reinforcing plate 24, such that channel 308 is sized and shaped to receive reinforcing plate end 24*a* or 24*b*.

In a preferred embodiment, bracket 302 has a T-shaped cross-section with arms 306 and 307 extending on opposites sides of spacer 304. Arm 307 similarly projects from spacer end 304*b* in the opposite direction from arm 306, and extends approximately parallel to the plane of the door face. Spacer 304, arm 307, and door face 12*b* define a longitudinal U-shaped channel 309 that extends horizontally across door 10 and is sized and shaped to receive reinforcing member 24, similarly to channel 308. FIG. 7 shows an embodiment of consecutive brackets 302 and 302' positioned on the outer side of door face 12*b*. Spacers 304 and 304' of brackets 302 and 302', and door face 12*b* form a C-shaped receptacle 26 that is sized and shaped to receive reinforcing plate 24. Channels 308 and 309' of brackets 302 and 302' are positioned at either end of receptacle 26, with the openings of U-shaped channels 308 and 309' facing each other to respectively receive ends 24*a* and 24*b* of reinforcing plate 24.

Reinforcing plate 24 may be installed by longitudinal sliding insertion into receptacle 26, as best shown in FIG. 5. In one embodiment, the distance between spacers 304 and 304' is sized to receive reinforcing plate 24 (e.g., a distance of at least reinforcing plate vertical height A), to allow sliding insertion of the reinforcing plate in receptacle 26. The distance between arms 306 and 307' of consecutive brackets 302 and 302' is smaller than reinforcing plate vertical height A, such that reinforcing plate 24 is retained in receptacle 26 by arms 306 and 307'.

Figure 8A:
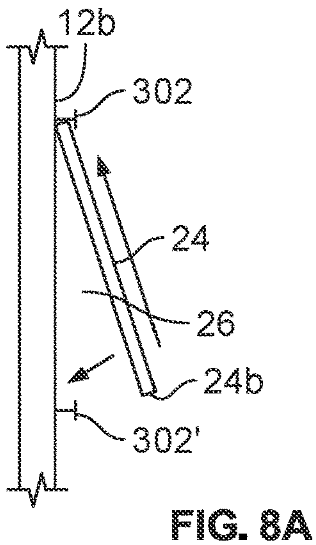
FIG. 8A is a partial, side section view of another embodiment of a modular security door, showing the initial step of installing a reinforcing plate.
Figure 8B:
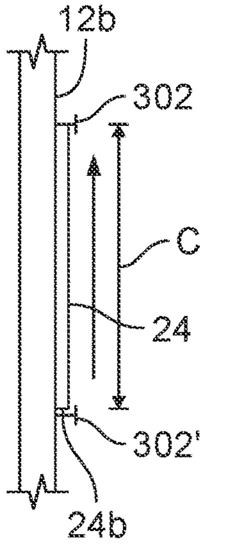
FIG. 8B is a partial, side section view of the modular security door of FIG. 8A, showing the reinforcing plate partially installed.
Figure 8C:
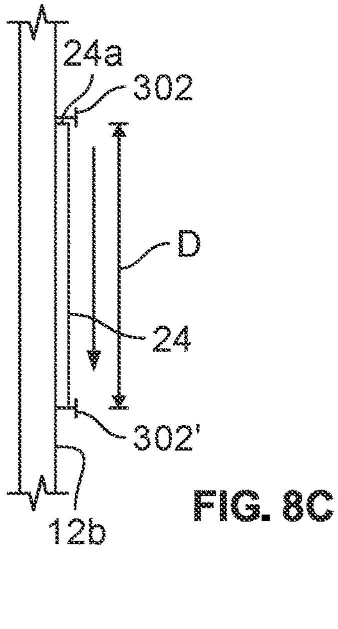
FIG. 8C is a partial, side section view of the modular security door of FIG. 8A, showing the installed reinforcing plate.

FIGS. 8A-8C show an alternative embodiment of brackets 302 and 302', that are configured for installation of reinforcing plate 24 by sequential insertion of end 24*a* in channel 308 of bracket 302, and end 24*b* in channel 309' of bracket 302'. Reinforcing plate end 24*a* is inserted transversely into channel 308 of bracket 302, and then end 24*b* is rotated toward door 10 and into receptacle 26 to position reinforcing plate 24 adjacent or flush against door face 12*b* (FIGS. 8A and 8B). The distance C between spacer 304 of bracket 302 and arm 307' of bracket 302' is greater than the reinforcing plate vertical height A, to allow the insertion of the reinforcing plate into receptacle 26. Reinforcing plate 24 is lowered transversely into receptacle 26 to position end 24*b* in channel 309' of bracket 302', and may be seated on spacer 304' (FIG. 8C). The distance D between spacer 304' of bracket 302' and arm 306 of bracket 302 is less than the height A of reinforcing plate 24, such that the reinforcing plate is retained in receptacle 26 by arms 306 and 307'.

The T-shape of brackets 302 facilitates the installation of multiple reinforcing plates 24 on door 10. Each bracket 302 forms channels 308 and 309 on opposite sides of spacer 304, such that a bracket may receive the end 24*a* of a first reinforcing plate in channel 308, and the end 24*b* of a second reinforcing plate in channel 309. The spacing between brackets 302 on door 10 may vary to form different size receptacles 26 for receiving reinforcing plates with different heights A, such as receptacles 26 and 26' shown in FIGS. 5 and 6.

Reinforcing plate width B is preferably about the width of door 10, to provide protection across the horizontal span of the door. In one embodiment, multiple reinforcing plates 24 are installed on door 10 to cover substantially all of door face 12*b*. Alternatively, reinforcing plates 24 are positioned to cover selected portions of door 10. The areas of door 10 that are most vulnerable to forced entry (e.g., drilling or cutting) are typically the areas adjacent to the panic bar, or security alarm wires, or other door security devices. Reinforcing plates 24 may be positioned at one or more of these vulnerable areas of door 10 to allow customization of protection as required for different applications or as otherwise may be desired. Additional reinforcing plates 24 are easily be installed at a later time to respond to changes in the required level of protection.

Similarly to reinforcing members 22, reinforcing plates 24 will typically be bulky and made of relatively heavy materials (e.g., steel). Modular security doors systems 300 and 400 allow reinforcing plates 24 to be inserted in brackets 302 after installation of door 10, which reduces the costs of manufacture, shipping, and facilitates installation of door 10 and the modular security door system. In one embodiment, security door "blanks" are provided without reinforcing plates 24 and with brackets 302 (or 502 discussed below) to allow customization of the number and location of the reinforcing plates. For example, a customized configuration of reinforcing plates 24 may be mounted on door 10 by a dealer prior to, upon, or after installation of the door at a job site. Modular door system 300 (or 400, 500 discussed below) also permits additional reinforcing plates 24 to be installed at a later time to supplement protection.

Figure 9A:
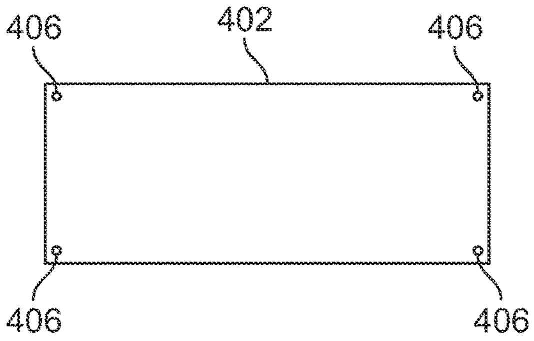
FIG. 9A is a front elevation view of an embodiment of a reinforcing plate for a modular security door.
Figure 9B:
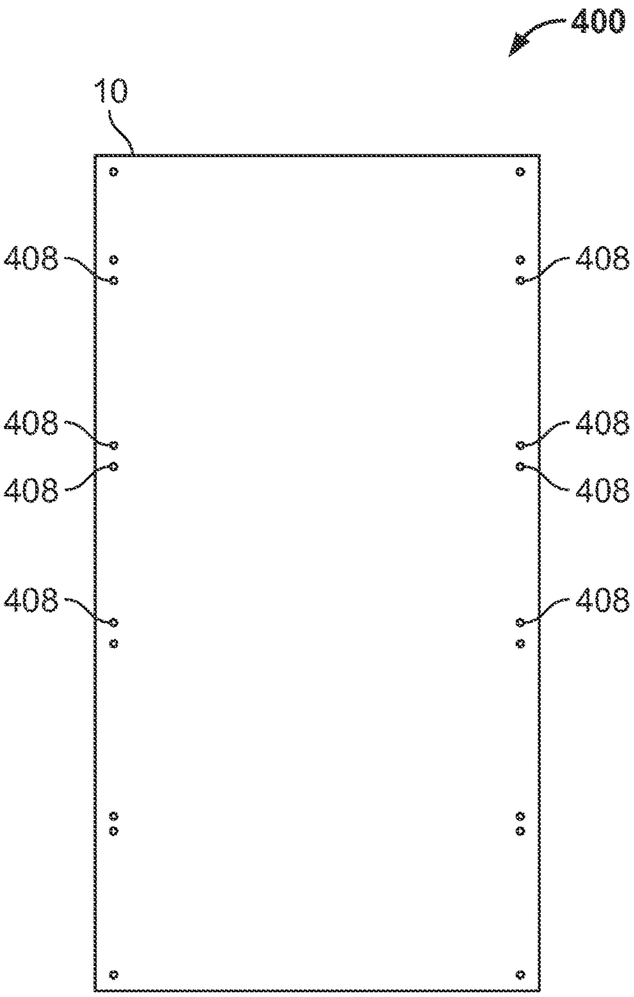
FIG. 9B is a rear elevation view of an embodiment of a modular security door for receiving the reinforcing plate of FIG. 9A.
Figure 10:
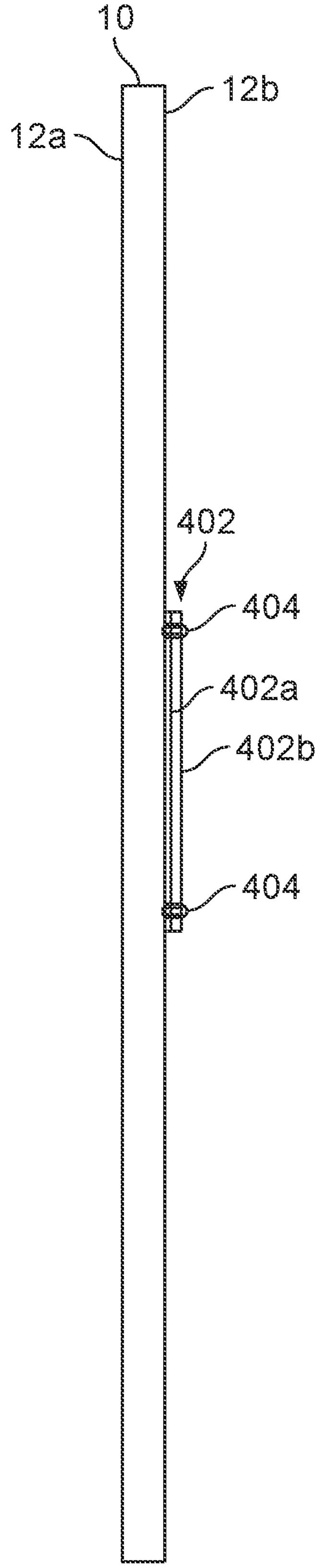
FIG. 10 is a side elevation view of the reinforcing plate of FIG. 9A installed on the modular security door of FIG. 9B.
Figure 11:
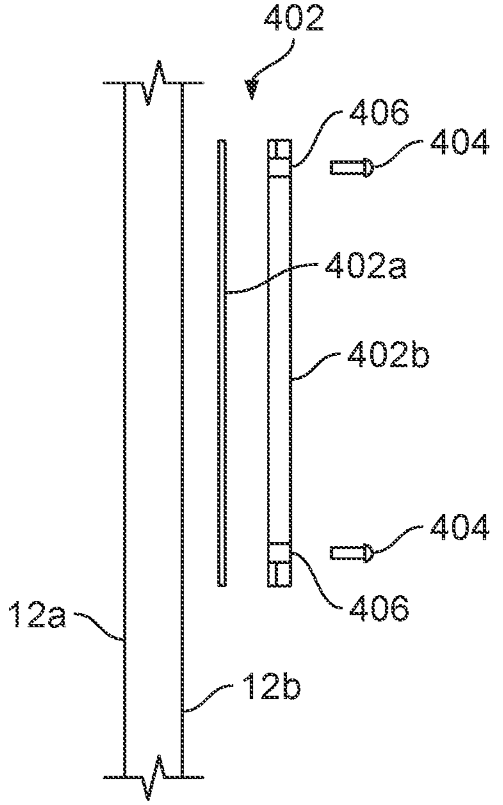
FIG. 11 is an exploded, side section view of the modular security door and reinforcing plate of FIG. 10.
Figure 12:
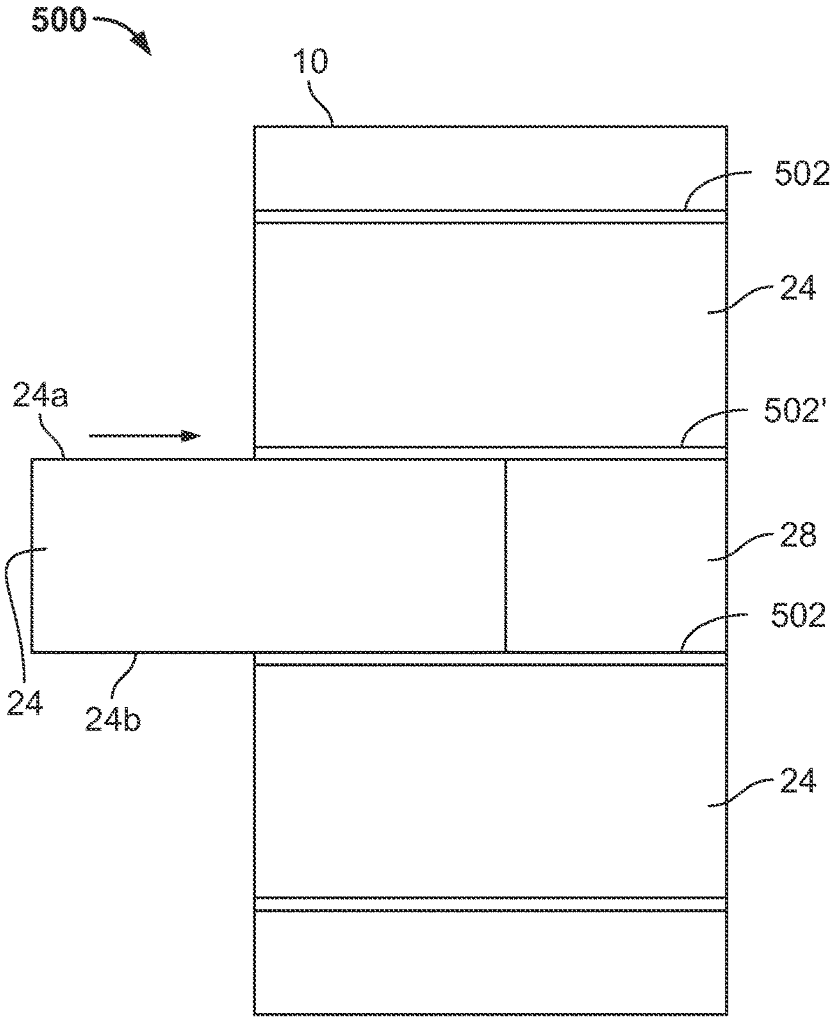
FIG. 12 is a front section view of another embodiment of a modular security door, showing the installation of a reinforcing plate.

FIGS. 9-11 show another embodiment of a modular door system 400, with a reinforcing member 402 that comprises different materials. In one embodiment, reinforcing member 402 is generally plate-shaped with a similar size and shape as reinforcing plate 24. Reinforcing plate 402 has a laminated structure comprising at least two layers 402*a* and 402*b* that are made of different materials that preferably have different physical properties. For example, an inner layer 402*a* positioned proximal to door 10 may be made of a material that provides resistance to drilling (e.g., ceramic), and an outer layer 402*b* may be made of a material that provides impact resistance (e.g., metal such as steel). Other metals and metal alloys may be used, as well as other non-metal materials, such as carbon fiber, polymer fiber (e.g., aramid fiber), and other materials known in the art.

Individual layers 402*a* and 402*b* may be laminated together to form reinforcing plate 402 before installation on door 10, or reinforcing plate 402 may be formed by assembly of the layers on door 10. Layers 402*a* and 402*b* may be laminated together and reinforcing plate 402 may be coupled to door 10 by various means known in the art that are appropriate for the materials, such as adhesives, welding and/or fasteners. A pre-assembled reinforcing plate 402 may also be installed on door 10 using guides or brackets (e.g., brackets 302). Door 10 (e.g., door face 12*b*) may also be modified to receive reinforcing plate 402.

In one embodiment, reinforcing plate 402 is coupled to door 10 by fasteners 404, such as screws, bolts, rivets or other fasteners known in the art. One or more openings 406 may be formed in reinforcing plate 402, that are sized and shaped to receive fasteners 404 (FIG. 9A). Similar openings 408 may be formed in door 10 (e.g., in door face 12*b*) that are positioned to correspond to openings 406 (FIG. 9B). Alternatively, individual layers 402*a* and 402*b* may have openings 406, and are assembled to form reinforcing plate 402 and coupled to door face 12*b* by fasteners 404, as shown in FIGS. 10 and 11.

In one embodiment, reinforcing plate 402 comprises a ceramic first (inner) layer 402*a* that is positioned adjacent to door 10. Ceramic layer 402*a* is preferably coupled to rear door face 12*b* by an adhesive and/or a subsequent (outer) layer 402*b* is coupled to ceramic layer 402*a* by an adhesive to improve the impact resistance of reinforcing plate 402. In the event that a ceramic layer is shattered or cracked, the fragments of the ceramic layer will be held in place by the adhesive and will continue to function. A ceramic layer is also preferably combined with a metal layer (e.g., a ceramic inner layer 402*a* and metal outer layer 402*b*) to improve the impact resistance and resilience of reinforcing plate 402.

Modular door systems 300 and 400 respectively comprise reinforcing plates 24 and 402 that are positioned externally to door 10—e.g., coupled to the outer surface of rear door face 12*b*. Alternatively, the reinforcing plates may be installed internally to the door. FIGS. 12-15 show an embodiment of a modular door system 500 with one or more housings that comprise a bracket 502 that is configured to receive and support a reinforcing plate 24 in door inner space 18. Bracket 502 is positioned in door inner space 18 and is coupled to one or both of door front and rear faces 12*a* and 12*b*. Bracket 502 extends horizontally across door 10 between vertical edges 14*a* and 14*b*, and preferably extends the entire horizontal width of the door. Bracket 502 includes an arm 508 that extends between the door front and rear faces. Reinforcing plate 24 is removably received on arm 508, which supports and positions the reinforcing plate in door inner space 18. Arm 508 may be aligned with an opening in door edge 14*a* and/or 14*b* (not shown) that is sized and shaped for sliding insertion of reinforcing plate 24 into door inner space 18 and onto arm 508.

Figure 13:
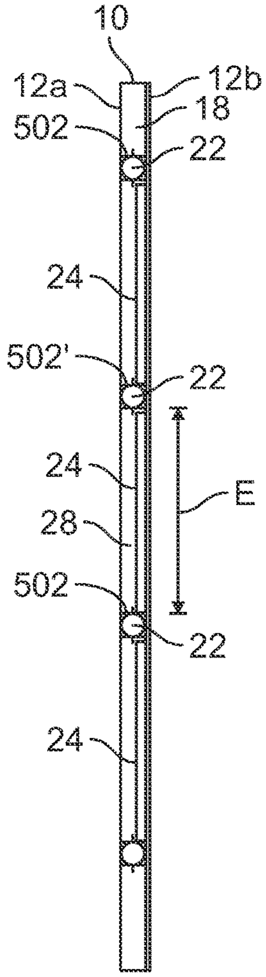
FIG. 13 is a side section view of the modular security door and reinforcing plate of FIG. 12.

As shown in FIG. 13, two brackets 502 may be vertically spaced apart within door inner space 18 by a distance E that is at least the vertical height A of reinforcing plate 24. A channel 28 is formed within door inner space 18 between the two brackets 502, that is sized to receive reinforcing plate 24. Door channel 28 restricts the vertical movement of reinforcing plate 24 within door inner space 18 to retain the reinforcing plate in position on door 10. Channel 28 may be aligned with an opening in door edge 14*a* and/or 14*b* (not shown) that is sized and shaped for sliding insertion of reinforcing plate 24 into door inner space 18 and channel 28, similarly to channel 104 and opening 20.

Bracket 502 may also be configured to form a channel for receiving an end 24*a* or 24*b* of reinforcing plate 24, to further restrict the movement of the reinforcing plate within door inner space 18. In one embodiment, bracket 502 includes a flange 516 positioned on arm 508 between door front and rear faces 12*a* and 12*b*. Flange 516 projects from arm 508 generally parallel to door front and rear faces 12*a* and 12*b*. A bracket channel 518 is formed between flange 516, arm 508, and door rear face 12*b*, for receiving reinforcing plate 24. In a preferred embodiment, flange 516 and door rear face 12*b* are spaced apart by a distance that is at least the thickness of reinforcing plate 24, such that bracket channel 518 is sized to receive an end 24*a* or 24*b* of the reinforcing plate. In one embodiment, reinforcing plate bottom end 24*b* is received in bracket channel 518 to position reinforcing plate 24 adjacent to door rear face 12*b*, and restrict the transverse movement of the reinforcing plate away from the door rear face.

Those of skill in the art will appreciate that bracket 502 may be oriented in door inner space 18 to receive reinforcing plate top end 24*a*, and/or may have the minor image configuration to position reinforcing plate 24 adjacent to door front face 12*a*. In a preferred embodiment, two brackets 502 are positioned and oriented in door inner space 18 to form a door channel 28 between the brackets for receiving reinforcing plate 24, with the top and bottom ends 24*a* and 24*b* received in bracket channels 518.

In one embodiment, bracket 502 may have a C-shaped configuration similar to bracket 202, with a base 504, and arms 506 and 508. Base 504 is coupled to door rear face 12*b*, with arms 506 and 508 positioned at the opposite ends of base 504 and extending between door front or rear faces 12*a* and 12*b*. Flanges 512 and 514 may respectively project from the ends of arms 506 and 508 opposite base 504, and extend generally parallel to door face 12*a* for coupling arms 506 and 508 to the door face.

Figure 14:
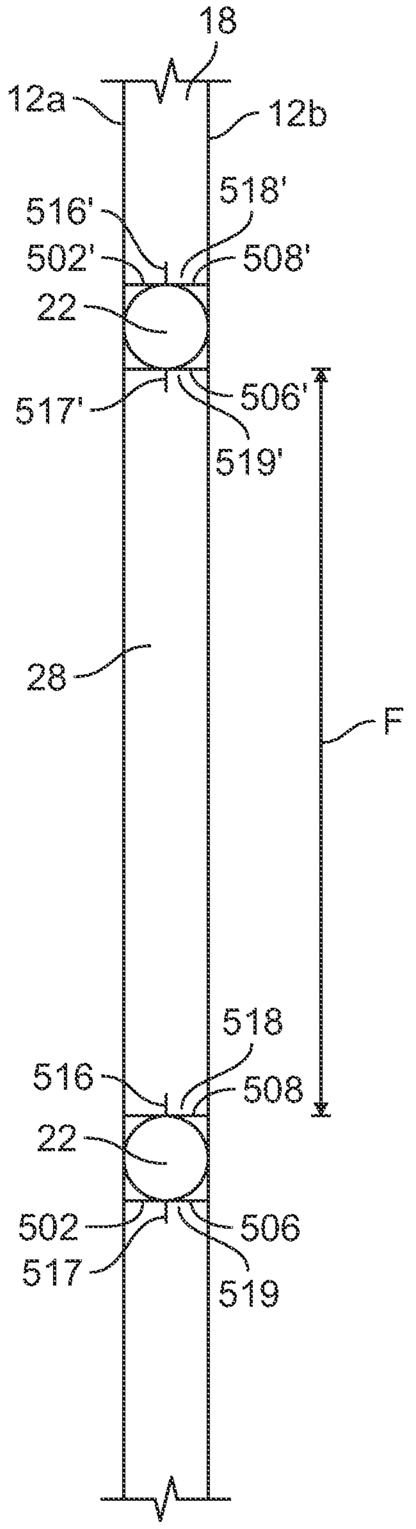
FIG. 14 is a detail view of the modular security door of FIG. 13.
Figure 15:
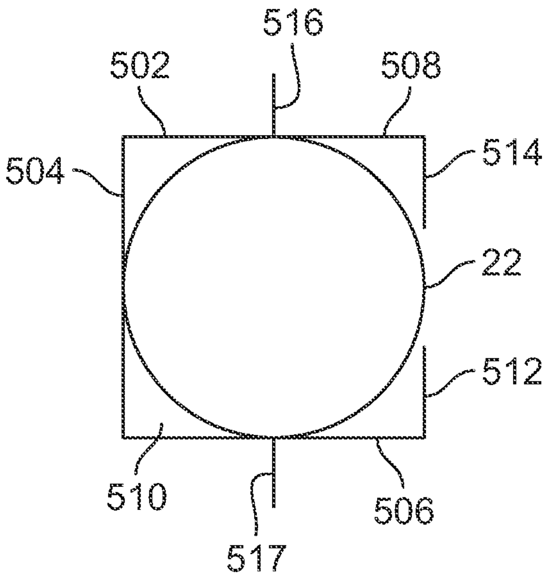
FIG. 15 is a side section view of an embodiment of a bracket for the modular door of FIG. 13.

In addition, bracket 502 has flanges 516 and 517 that respectively project from arms 508 and 506 to form channels for receiving an end 24*a* or 24*b* of reinforcing plate 24. Flanges 516 and 517 extend in opposite directions away from bracket 502, generally parallel to door front and rear faces 12*a* and 12*b*. As best shown in FIG. 14, bracket channel 518 is formed between flange 516, arm 508, and door rear face 12*b* for receiving reinforcing plate end 24*b*. Bracket channel 519 is similarly formed between flange 517, arm 506, and door rear face 12*b* for receiving reinforcing plate end 24*a*. Flanges 516 and 517 are preferably spaced apart from door rear face 12*b* by a distance that is at least the thickness of reinforcing plate 24, such that bracket channels 518 and 519 are respectively sized to receive reinforcing plate ends 24*b* and 24*a*.

Brackets 502 and 502' are positioned to form a channel in door inner space 18 between the brackets for receiving reinforcing plate 24. Arm 508 of bracket 502, and arm 506' of bracket 502' are spaced apart in door inner space 18 by a distance that is at least the vertical height A of a reinforcing plate 24 (not shown). Door channel 28 is formed between arms 508 and 506' that is sized to receive the reinforcing plate, with reinforcing plate bottom end 24*b* received in bracket channel 518, and top end 24*a* received in bracket channel 519. In a preferred embodiment, positioning reinforcing plate ends 24*a* and 24*b* in bracket channels 518 and 519 positions reinforcing plate 24 adjacent to door rear face 12*b*. The distance F between flanges 516 and 517' of brackets 502 and 502' is less than the vertical height of reinforcing plate 24 to restrict the transverse movement of the reinforcing plate in door channel 28, and retain the reinforcing plate in position adjacent to door rear face 12*b*.

Modular door system 500 may also combine reinforcing plates 24 and reinforcing members 22. In one embodiment, bracket 502 has a similar configuration to bracket 202, with a generally rectangular cross-section with an inner channel 510 formed between base 504 and arms 506 and 508. Bracket inner channel 510 is sized and shaped to removably receive reinforcing member 22.

Brackets 502 preferably extend horizontally across door 10, and span the width of the door. Alternatively, multiple brackets 502 may be used to span the width of door 10, similarly to brackets 202—i.e. with arms 508 and 506, and/or bracket channels 510 of the brackets horizontally aligned to receive a reinforcing plate 24 and/or reinforcing member 22. Multiple brackets 502 may also be positioned or arranged vertically in door inner space 18 to receive multiple reinforcing plates 24 and reinforcing members 22 that extend vertically over door 10. As shown in FIG. 13, modular door system 500 may comprise multiple brackets 502 that are arranged in door inner space 18 to receive a series of alternating reinforcing plates 24 and reinforcing members 22 that extend substantially across the height and width of door 10. Those of skill in the art will appreciate that other combinations and configurations of reinforcing plates 24 and reinforcing members 22 may be used.

Bracket 502 may be made of similar materials as bracket 202, such as metal (e.g., bent sheet steel) or other materials known in the art, and may also provide structural support to hollow core door 10. Bracket 502 is also secured to door faces 12*a* and/or 12 by welding, fasteners (e.g., screws, bolts, rivets), adhesives or other methods known in the art.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A security door system, comprising:
- a first reinforcing member;
- a hollow door having opposite first and second faces, opposite first and second vertical edges, opposite top and bottom ends, an inner space between the first and second faces, and an opening in at least one of the first and second vertical edges, the opening sized and shaped to receive the first reinforcing member; and
- a housing positioned in the inner space, wherein the housing is a C-shaped bracket comprising:
  - a base coupled to the first face, and having first and second base ends;
  - first and second arms respectively positioned at the first and second base ends and extending between the first and second faces; and
  - a first bracket channel formed between the base and first and second arms, the first bracket channel sized and shaped to receive the first reinforcing member;
- wherein the first bracket channel is aligned with the opening to removably receive the first reinforcing member through the opening.

2. The security door system of claim 1, wherein at least one of the first and second arms is coupled to the second face.

3. The security door system of claim 1, wherein at least one of the first and second arms has a flange extending parallel and coupled to the second face.

4. The security door system of claim 1, wherein the first reinforcing member is a rod extending between the first and second vertical edges.

5. The security door system of claim 1, further comprising:
- a flange projecting from the first arm and extending away from the housing; and
- a second bracket channel formed between the flange, the first arm, and the first or second face.

6. The security door system of claim 5, further comprising a second reinforcing member;

wherein the second bracket channel is sized and shaped to receive the second reinforcing member.

7. The security door system of claim 6, wherein the second reinforcing member is a plate having an end; and wherein the second bracket channel is sized and shaped to receive the second reinforcing member end.

8. A security door system, comprising:

first and second reinforcing members;

a hollow door having opposite first and second faces, opposite first and second vertical edges, opposite top and bottom ends, an inner space between the first and second faces, and an opening in at least one of the first and second vertical edges, the opening sized and shaped to receive the first reinforcing member; and first and second housings positioned in the inner space, wherein each of the first and second housings is a C-shaped bracket comprising:

a base coupled to the first face, and having first and second base ends;

first and second arms respectively positioned at the first and second base ends and extending between the first and second faces;

a first flange projecting from the first arm and extending away from the housing;

a second flange projecting from the second arm and extending away from the housing opposite the first flange;

a first bracket channel formed between the base and first and second arms, the first bracket channel sized and shaped to receive the first reinforcing member;

a second bracket channel formed between the first flange, the first arm, and the first or second face, the second bracket channel sized and shaped to receive the second reinforcing member; and a third bracket channel formed between the second flange, the second arm, and the first or second face, the third bracket channel sized and shaped to receive the second reinforcing member;

wherein the first bracket channel is aligned with the opening to removably receive the first reinforcing member through the opening; and wherein the second reinforcing member is received in the second bracket channel of the first housing, and the third bracket channel of the second housing.

9. The security door system of claim 8, wherein the first reinforcing member is a rod extending between the first and second vertical edges; and wherein the second reinforcing member is a plate having first and second plate ends, the second bracket channel is sized and shaped to receive the first plate end, and the third bracket channel is sized and shaped to receive the second plate end.

* * * * *